US007240338B1

(12) United States Patent
Bell et al.

(10) Patent No.: US 7,240,338 B1
(45) Date of Patent: Jul. 3, 2007

(54) COMPUTER LANGUAGE TRANSLATION SYSTEM AND METHOD OF CONVERTING PROCEDURAL COMPUTER LANGUAGE SOFTWARE TO OBJECT-ORIENTED COMPUTER LANGUAGE SOFTWARE

(75) Inventors: Edward A. Bell, Melbourne, FL (US); Alan D. Mollick, Melbourne, FL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 565 days.

(21) Appl. No.: 10/446,725

(22) Filed: May 29, 2003

(51) Int. Cl.
*G06F 9/45* (2006.01)
(52) U.S. Cl. .................................................. 717/137
(58) Field of Classification Search ........ 717/116–124, 717/147–149, 157, 159; 719/331; 718/102, 718/107
See application file for complete search history.

(56) References Cited

U.S. PATENT DOCUMENTS

| | | | |
|---|---|---|---|
| 5,812,852 A * | 9/1998 | Poulsen et al. ............. | 717/149 |
| 6,002,874 A * | 12/1999 | Bahrs et al. ................. | 717/157 |
| 6,031,993 A | 2/2000 | Andrews et al. | |
| 6,275,976 B1 * | 8/2001 | Scandura ..................... | 717/120 |
| 6,301,700 B1 | 10/2001 | Choi et al. | |
| 6,317,871 B1 | 11/2001 | Andrews et al. | |
| 6,317,873 B1 | 11/2001 | Townsend | |
| 6,360,359 B1 | 3/2002 | Matsuo | |
| 6,467,079 B1 | 10/2002 | Ettritch et al. | |
| 6,523,171 B1 | 2/2003 | Dupuy et al. | |
| 2002/0026632 A1 | 2/2002 | Fuchs et al. | |
| 2002/0100031 A1 | 7/2002 | Miranda et al. | |

FOREIGN PATENT DOCUMENTS

JP    1066733    3/1989

OTHER PUBLICATIONS

Ewer et al., "Case Study: An incremental approach to re-engineering a legacy FORTRAN Computational Fluid Dynamics code in C++", University of Greenwich, Feb. 16, 2002, pp. 1-20; URL: <http://www.gre.ac.uk/~ej02/research/reng.html>.*

(Continued)

*Primary Examiner*—Tuan A Vu
(74) *Attorney, Agent, or Firm*—Edell, Shapiro & Finnan, LLC

(57) ABSTRACT

Common data structures associated with procedurally-oriented software, such as Fortran COMMON blocks, are translated into object-oriented (OO) classes. Procedurally-oriented software modules are reduced in complexity by extracting an appropriate number of sub-modules from the original source code so that the original module and each extracted module is below a predetermined complexity level, if possible. The original module and extracted modules are assigned to an object-oriented class based upon a measure of each modules' association to the respective class' data members, where the assigned modules are then translated into object-oriented methods. This approach greatly reduces overall system development time and costs by automatically generating maintainable object-oriented code based upon translated procedurally-oriented source code. Man-hours are further saved by automatically documenting the newly generated object-oriented classes and by automatically generating test suite files for use in verifying and troubleshooting the automatically generated object-oriented classes.

33 Claims, 11 Drawing Sheets

OTHER PUBLICATIONS

Patterson et al., "An Application of Entity Life Modeling to Incremental Reengineering of Fortran Reactive Program Components", Technical Report ISSE TR 94 108, 1994; pp. 1-23.*

Sneed et al., "Extracting Object-Oriented Specification from Procedurally Oriented Programs", SES Software Engineering Service GmbH, 1995; pp. 217-226.*

Marrit Harsu, A Survey of Object Identification in Software Re-Engineering, Department of Computer Science, Apr. 1998, A-1998-6, University of Tampere, Tampere, Finland.

Marrit Harsu, Re-Engineering Legacy Software through Language Conversion, Jun. 2000, University of Tampere, Tampere, Finland.

* cited by examiner

COMPUTER LANGUAGE TRANSLATION SYSTEM AND METHOD OF CONVERTING PROCEDURAL COMPUTER LANGUAGE SOFTWARE TO OBJECT-ORIENTED COMPUTER LANGUAGE SOFTWARE

GOVERNMENT INTERESTS

This invention was made with government support under Contract No. F04701-01-C-0001 awarded by the United States Air Force to ITT Manufacturing Enterprises, Inc. The Government has certain rights in this invention.

BACKGROUND OF THE INVENTION

1. Technical Field

The present invention pertains to software conversion or translation systems. In particular, the present invention pertains to a computer system for translating procedurally-oriented software into object-oriented software.

2. Discussion of Related Art

One of the greatest challenges facing commercial sector and government information technology (IT) professionals is the maintenance of legacy systems. Often, such legacy systems include legacy software with tens of thousands or even millions of lines of code written in unstructured or otherwise outdated software languages. Much of this legacy software cannot execute on modern hardware platforms employing present day operating systems.

The problems associated with maintaining such legacy systems are significant and include: a shortage of trained personnel competent to support the hardware and operating system platforms upon which the legacy system executes; a shortage of trained personnel capable of implementing changes/updates/fixes within the legacy software itself; inability to integrate new hardware (e.g., memory storage devices, printers/peripheral, communication devices) with older hardware/operating system platforms; and a buildup of unreliable patches and unintelligible quick fixes within the legacy code that undermine reliability and operational effectiveness. Such issues typically translate into increased maintenance costs and severely restrict the ability to take advantage of advancements in technology.

Typically, the deficiencies associated with legacy software described above are corrected by rewriting the legacy application in a modern programming language that is compatible with current hardware platform/operating systems and/or executes within a virtual, platform independent execution environment. However, depending upon the complexity and number of software lines of code (SLOC) associated with a legacy system, such legacy system re-writes can require thousands of man-hours. To reduce the number of man-hours required for such a legacy system re-write, a large number of software tools have been developed that attempt to automate translation of legacy application software modules from a legacy software language to a modern software language. Unfortunately, such conventional tools have met only with limited degrees of success.

The current state of the art in software development relies heavily on the notion of object-oriented design. The essence of object-oriented design involves abstraction, which is the process by which a programmer creates a user-defined data type for the language to process. Support for data abstraction makes object-oriented (OO) languages ideal for use in rewriting legacy systems. By way of example only, source code designed to operate in a CDC Cyber platform environment is designed to make use of 60-bit word sizes, 6-bit bytes, one's complement binary word formats, and use the CDC Fortran I-Blocked/W-Record binary file structure. Using object-oriented design abstraction to create user-defined data types, the special data structure and formatting needs of legacy system software can be accommodated. For example, using object-oriented design abstraction, unique requirements associated with code designed specifically to operate in the CDC Cyber environment can be accommodated, allowing the original code to be translated into code that operates within modern hardware platform/operating system environments with 32 or 64 bit word sizes, 8-bit bytes, and two's complement binary word formats.

A current object-oriented software language that supports object-oriented design is known as C++. One mechanism by which the C++ language supports the elements of object-oriented design abstraction is through the use of object-oriented classes. A class provides the ability to encapsulate the data representation and behavior of a user-defined type within details internal to the implementation of the class, and behind the public interface of an abstract data type.

In an object-oriented language, classes may be used to group both data variables and subroutines together. When a subroutine is grouped into a class it becomes a class member function (also known as a class method.) A class includes data members, class methods and custom operators, all interrelated, such that the aggregate (i.e., the class) acts as a unique object. Class data members and class methods are generally grouped together into a class based on some shared relationship.

An instantiation of such a class is known as an object. When a program is written such that most if not all non-local data variables and subroutines are class members, the program is considered to be object-oriented. That is to say, an object-oriented program is a collection of objects (instantiated classes) which interact with each other for some greater purpose.

Prior to object-oriented programming, the most common programming paradigm was procedurally-oriented programming. Procedurally-oriented languages do not have constructs similar to classes which contain both data and subroutine members. Many legacy applications have been written using a procedural programming paradigm. These legacy programming languages do not support the modern object-oriented paradigm and include applications that typically include a block of global data variables accessed by any number of subroutines. One such procedural language is Fortran. These global data blocks are commonly used to organize data variables by some related function or task. Fortran, for example, supports use of a specific COMMON block structure that allows the programmer to group data variables based on some shared purpose.

The related art has provided several language translators. For example, F2c maintained by AT&T, For_c available from Cobalt Blue, Pfc available from Promula and Fortran2c available from Realistic Technologies Inc. (RTI), each translate a type of Fortran to C. For_struct, available from Cobalt Blue, translates Fortran IV to Fortran 77, while For_cpp from Cobalt Blue and Evolution 2000 available from The Software Revolution, Inc. each translate Fortran source code to C++. C2c++ freeware translates C source code to C++ and an F2j prototype translates Fortran source code to Java. However, no conventional software tool currently exists that can exploit the organization of global data blocks, and their associations with the respective modules of procedurally-oriented code, to facilitate the automatic construction of object-oriented classes and to improve the accuracy and effectiveness of object-oriented code generated from procedurally-oriented code.

Accordingly, a need in the art exists to improve the accuracy and effectiveness of object-oriented code generated from procedurally-oriented code by using information derived from relationships between legacy or procedurally-oriented software modules and their associated common block or global data structures.

OBJECTS AND SUMMARY OF THE INVENTION

Accordingly, it is an object of the present invention to automatically translate procedurally-oriented software code into maintainable object-oriented (OO) code to reduce overall system development time and costs.

It is another object of the present invention to build object-oriented classes containing data members and method members that support functions consistent with the original procedurally-oriented modules from which the object-oriented classes are translated.

Yet another object of the present invention is to reduce the complexity of object-oriented methods automatically generated from procedurally-oriented source modules.

Still another object of the present invention is to optimize object-oriented software code generated from procedurally-oriented software modules.

The aforesaid objects may be achieved individually and/or in combination, and it is not intended that the present invention be construed as requiring two or more of the objects to be combined unless expressly required by the claims attached hereto.

According to the present invention, common, shared, or global data structures associated with procedurally-oriented software, such as Fortran COMMON blocks, are translated into object-oriented classes. Procedurally-oriented software modules are reduced in complexity by extracting an appropriate number of sub-modules from the original source code so that the original module and each extracted module is below a predetermined complexity level, if possible. The original module and extracted modules are assigned to an object-oriented class based upon a measure of each modules' association to the respective class' data members, where the assigned modules are then translated into object-oriented methods. This approach greatly reduces overall system development time and costs by automatically generating maintainable object-oriented (OO) code based upon translated procedurally-oriented source code. Man-hours are further saved by automatically documenting the newly generated object-oriented classes and by automatically generating test suite files for use in verifying and troubleshooting the automatically generated object-oriented classes.

By generating object-oriented classes based upon an assessment of procedurally defined data structures and assigning methods (e.g., translated from procedural modules/sub-modules) to the generated classes based upon associations between the original procedural modules/sub-modules and the original procedural data structures, the present invention automatically builds object-oriented classes that support functions consistent with original procedurally-oriented modules.

Complexity of the generated object-oriented classes is reduced by slicing or decomposing procedural modules above a pre-selected level of complexity (e.g., as determined based upon any of a wide selection of complexity algorithms) into less complicated modules prior to translating the respective procedural modules into object-oriented methods and assigning the methods to object-oriented classes. By reducing the complexity of generated object-oriented methods, assignment of a method to a generated object-oriented class is simplified.

Improved maintainability of the generated object-oriented classes is achieved by assigning methods to classes in a manner that maximizes private class members and hence, minimizes the use of public class members. Each method is assigned to the generated class that results in the greatest number of private class members. Once all methods are assigned to classes, only class members that must be shared across classes are made public.

The procedural to object-oriented translation of the present invention employs arrays of pointers to manipulate and reorganize the logical statements associated with source code procedural modules and data structures. These arrays of pointers support numerous functions associated with the translation of procedurally-oriented source code to object-oriented code that include: storing procedurally-oriented source code file logical statements; defining object-oriented classes based upon procedural data structures identified within stored source code logical statements; assessing the complexity of procedural modules; identifying module-to-module, class-to-class, and module-to-class relationships; slicing or decomposing overly complex modules into less complex modules; determining optimal assignment of modules to classes; translating assigned modules into class methods; generating documentation that describes the generated object-oriented classes; and generating test suite files that support the validation and troubleshooting of generated object-oriented classes.

The present invention is used to translate procedurally-oriented modules into object-oriented software in which generated methods are allocated to generated classes in a manner that creates well documented, maintainable object-oriented classes with minimal execution errors. Further, the present invention generates resources used to efficiently identify, troubleshoot and resolve execution errors. The present invention provides a procedural to object-oriented translation tool ideally suited for use in converting procedurally-oriented or legacy software of any size or complexity to an object-oriented system, whether the size of the procedural or legacy software is measured in hundreds, thousands, or millions of software lines of code (SLOC). By saving man-hours, reducing costs, and achieving reproducible, sustainable results, the present invention allows legacy systems that would otherwise falter be effectively sustained within a reasonable time-frame and within an affordable budget.

The above and still further objects, features and advantages of the present invention will become apparent upon consideration of the following detailed description of specific embodiments thereof, particularly when taken in conjunction with the accompanying drawings wherein like reference numerals in the various figures are used to designate like components.

DETAILED DESCRIPTION OF THE PREFERRED EMBODIMENTS

Figure 1:
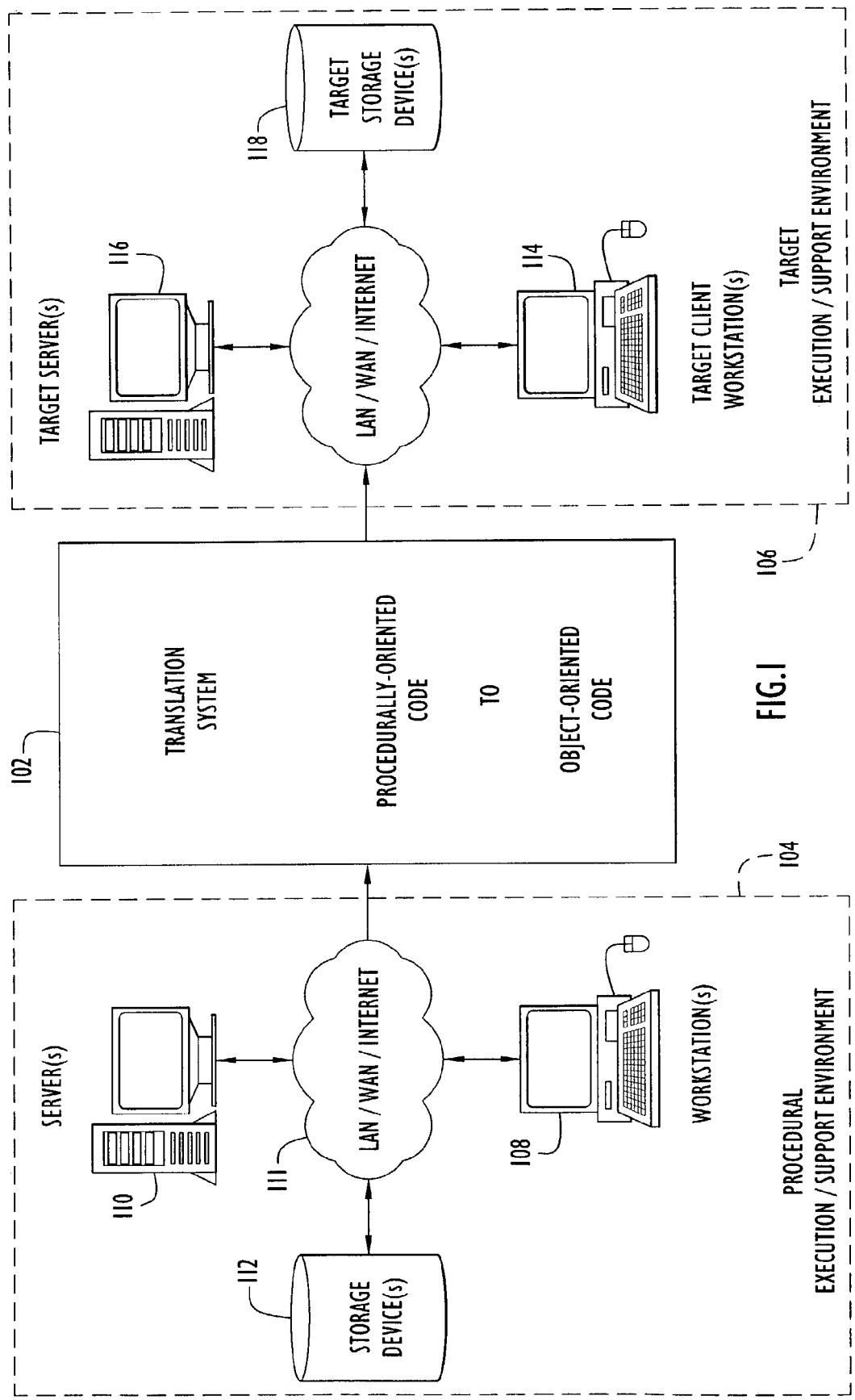
FIG. 1 is a diagrammatic illustration of the present invention translation system utilized to facilitate translation of a procedural or legacy system from a procedural execution/support computer environment to a target execution/support computer environment.

Referring to FIG. 1, translation system 102 of the present invention expedites the migration of a procedurally-oriented module-based software application executing within a procedural or legacy execution environment 104, to an object-oriented class-based application executing within a selected target execution environment 106.

A typical procedurally-oriented or legacy application can be a relatively simple application of several hundred to several thousand software lines of code (SLOC) executing upon a single computer workstation 108. Alternatively, a procedural or legacy application can include many thousands or millions of lines of code with application components executing on plural servers or processors 110, coordinating access, for example, from many workstations 108 via a LAN/WAN/Internet network 111 to information stored in plural storage devices 112.

The translation system of the present invention automatically translates a procedurally-oriented module-based application into an object-oriented class-based application that corresponds in function and operation to the original application and is compatible with a wide range of modern operating systems and platform independent execution environments, as well as the most modern, high-speed hardware platforms and peripherals. Further, the generated object-oriented code can be extended with existing object-oriented classes and/or integrated within an entirely new object-oriented application.

As a result of using translation system 102, object-oriented applications generated from procedural applications can be deployed to a target environment 106 that includes a target workstation 114 and/or target server or processor 116. Alternatively, object-oriented applications generated from larger procedural or legacy applications and/or object-oriented applications that represent an expansion in scope from the original application can deploy object-oriented components to plural target workstations 114, target servers or processors 116 and/or target storage devices 118 within target execution environment 106.

Figure 2:
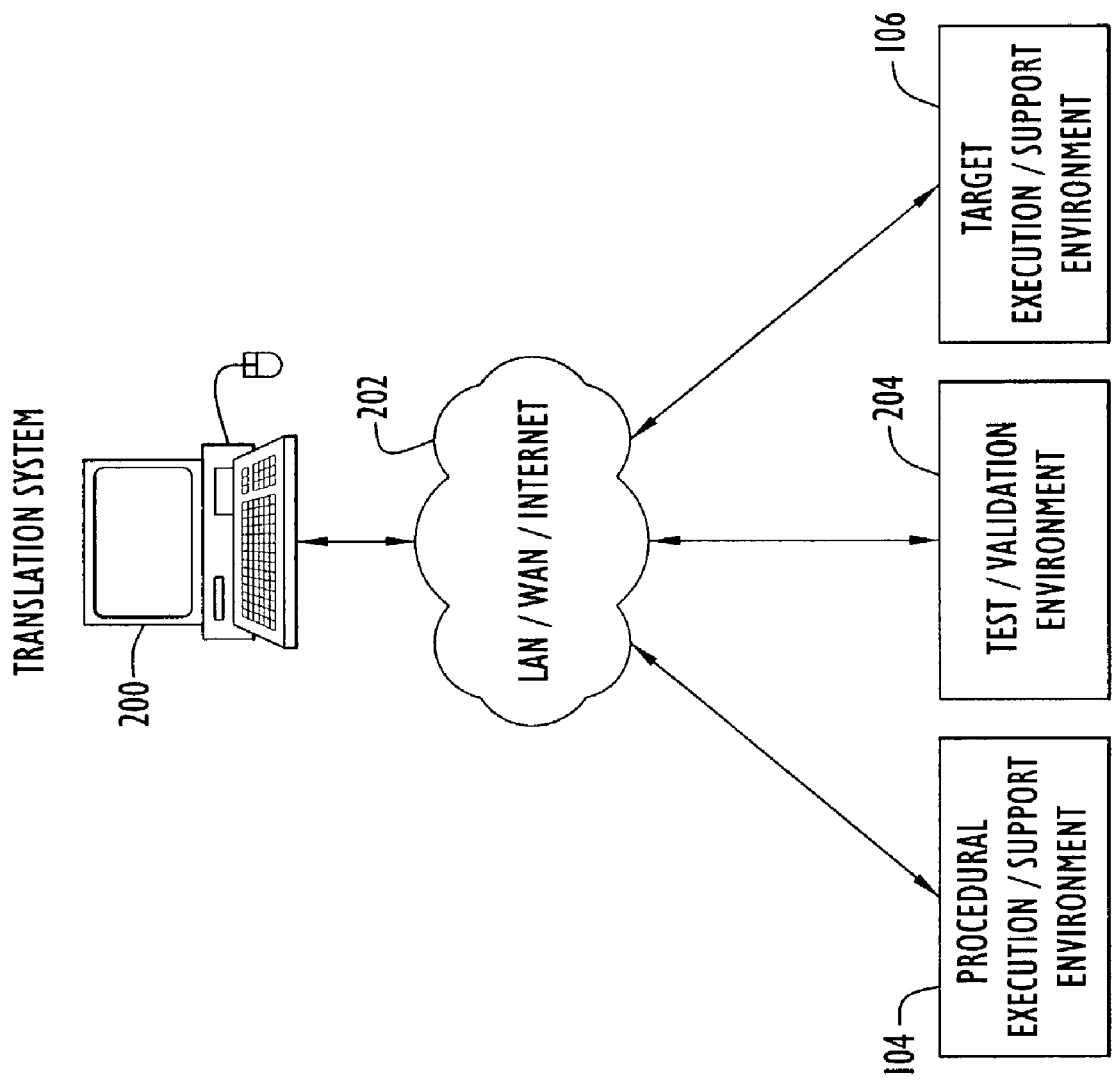
FIG. 2 is a system level block diagram of a translation system according to the present invention in communication with procedural or legacy execution and test environments and a target computer environment, via a network, to expedite the generation, validation and deployment of object-oriented software code.

A translation system 200 is illustrated in FIG. 2. Specifically, system 200 is typically implemented by a workstation or computer system and may interface with procedural execution/support environment 104, a test/validation environment 204, and target execution/support environment 106 via a network 202. Translation system 200 may receive procedurally-oriented module-based system source code from execution/support environment 104 via network 202 and produces object-oriented classes (e.g., with assigned subclasses, data members and methods), test suite files appropriate for use with an object-oriented test suite test to validate and troubleshoot the generated object-oriented code, and object-oriented class documentation. Preferably, the translation system includes a software module executable from an operating system (e.g., DOS) prompt. The module accesses the procedural source code (stored locally or remotely) and produces the desired object-oriented code and associated files.

Upon generating one or more objected-oriented classes and associated test suite files and documentation, the corresponding files may be transported to a test/validation environment 204 to verify that the generated object-oriented classes execute in a manner consistent with the original application and that the generated documentation includes sufficiently accurate and useful information. Once validated within a test-suite environment, the object-oriented modules can be deployed to target execution/support environment 106 for operational test and verification.

Depending upon the size of the procedurally-oriented module-based system to be translated, the translation system can be deployed within a translation system operations/development environment that includes plural translation system workstations, storage devices, and servers that facilitate the coordination of plural developers working together to systematically translate the respective procedural or legacy system application modules. Alternatively, in support of smaller translation efforts, translation system 200 and test/validation environment 204, can be integrated within a single translation system workstation.

The translation system is typically implemented by a conventional personal or other suitable computer system or workstation preferably equipped with a display or monitor, a base (e.g., including the processor, memories and/or internal or external communications devices (e.g., modem, network cards, etc.)), a keyboard and optional mouse or other input device. The computer system includes software (e.g., operating system, translation software, etc.) and appropriate components (e.g., processor, disk storage or hard drive, etc.) including sufficient processing and storage capabilities to effectively execute that software. The translation system is preferably implemented in a commercially available object-oriented computer language, while the computer system may include any platform that supports the selected software language (e.g., Unix, Windows, Macintosh, DOS, etc.). However, the translation system software may be implemented in any desired computing language with the computer system utilizing any of the major platforms (e.g., Linux, Macintosh, Unix, OS2, Windows, etc.). By way of example, the translation system may be implemented by a personal computer (PC) with a one gigahertz processor and employing a Windows 2000 platform. The computer system, under software control, basically implements the translation system of the present invention for converting procedurally-oriented source code to object-oriented source code as described below. The computer system preferably operates as a stand-alone tool. However, the present invention may be in the form of an embeddable system (e.g., within another system, as an embeddable software component within other software, etc.) or the computer system may function as a server in communication with client or user systems to process client requests. The translation system software may be available on a recorded medium (e.g., magnetic, optical, floppy, DVD, CD, etc.) or in the form of a carrier wave or signal for downloading from a source via a communication medium (e.g., bulletin board, network, WAN, LAN, Intranet, Internet, etc.).

Figure 3:
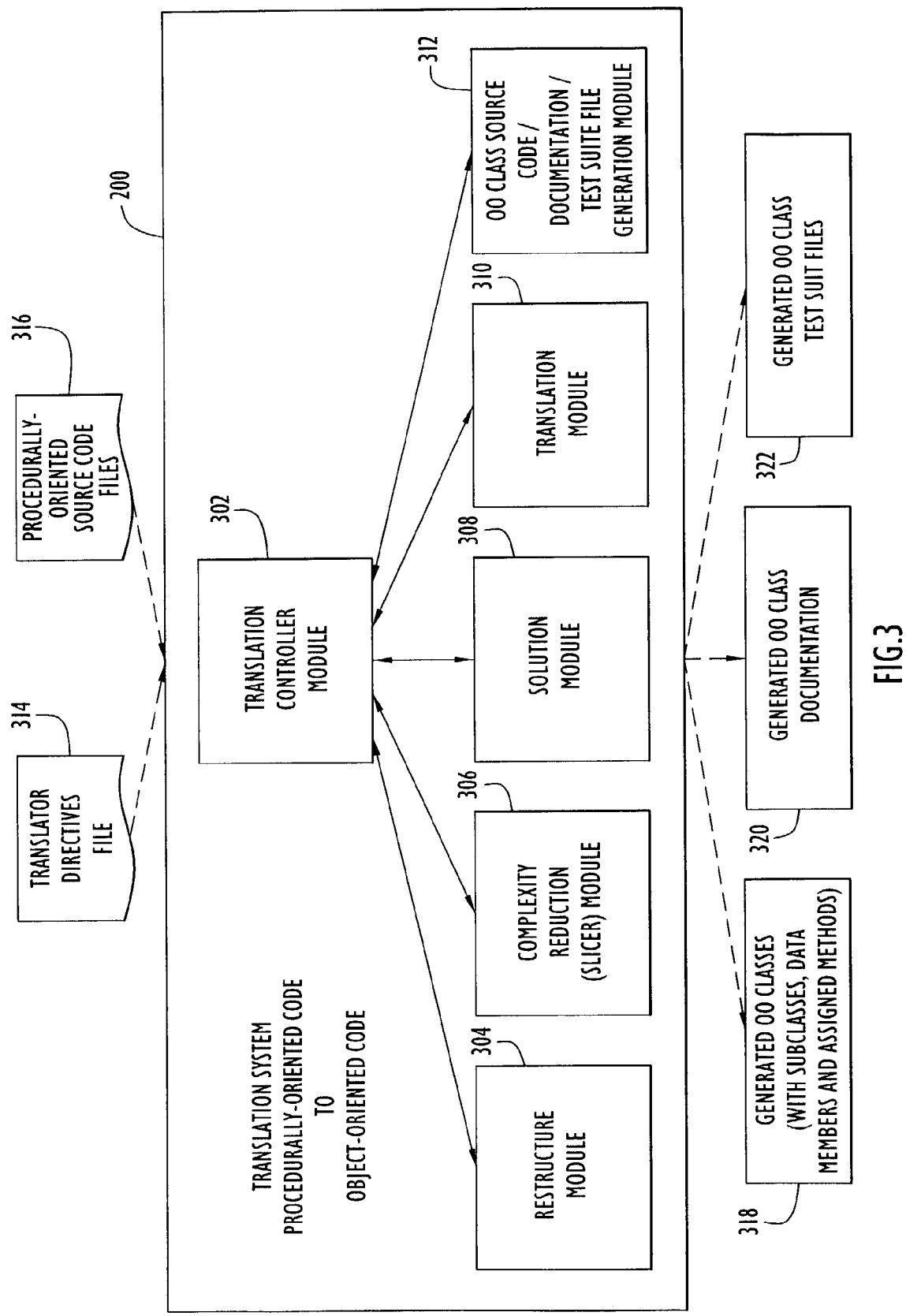
FIG. 3 is a block diagram of the software architecture of the translation system of FIG. 2.

The translation system software architecture is illustrated in FIG. 3. Specifically, translation system 200 includes a translation controller module 302, a restructure module 304, a complexity reduction (slicer) module 306, a solution module 308, a translation module 310, and an object-oriented class source code/documentation/test suite file generation module 312. The controller module controls and coordinates activities performed by the remaining modules to translate procedural software code to object-oriented code. The restructure module converts unstructured language constructs to structured programming constructs, while slicer module 306 decomposes modules based on module complexity. The solution module assigns modules to classes and the translation module converts assigned modules to the target computer language. Module 312 produces files associated with the generated code.

The translation system receives input from a translator directives file 314 that identifies procedural source code files 316. Source code files 316 are processed by modules 302, 304, 306, 308, 310 and 312 as described below to generate object-oriented classes (with subclasses, data members and assigned methods) 318, object-oriented class documentation 320, and object-oriented class test suite files 322 suitable for use in testing and troubleshooting the generated classes. Preferably, the translation system converts from Fortran source code to object-oriented C++ source code, however, the system may be utilized to convert software in any procedural language to object-oriented code in substantially the same manner described below.

Figure 4:
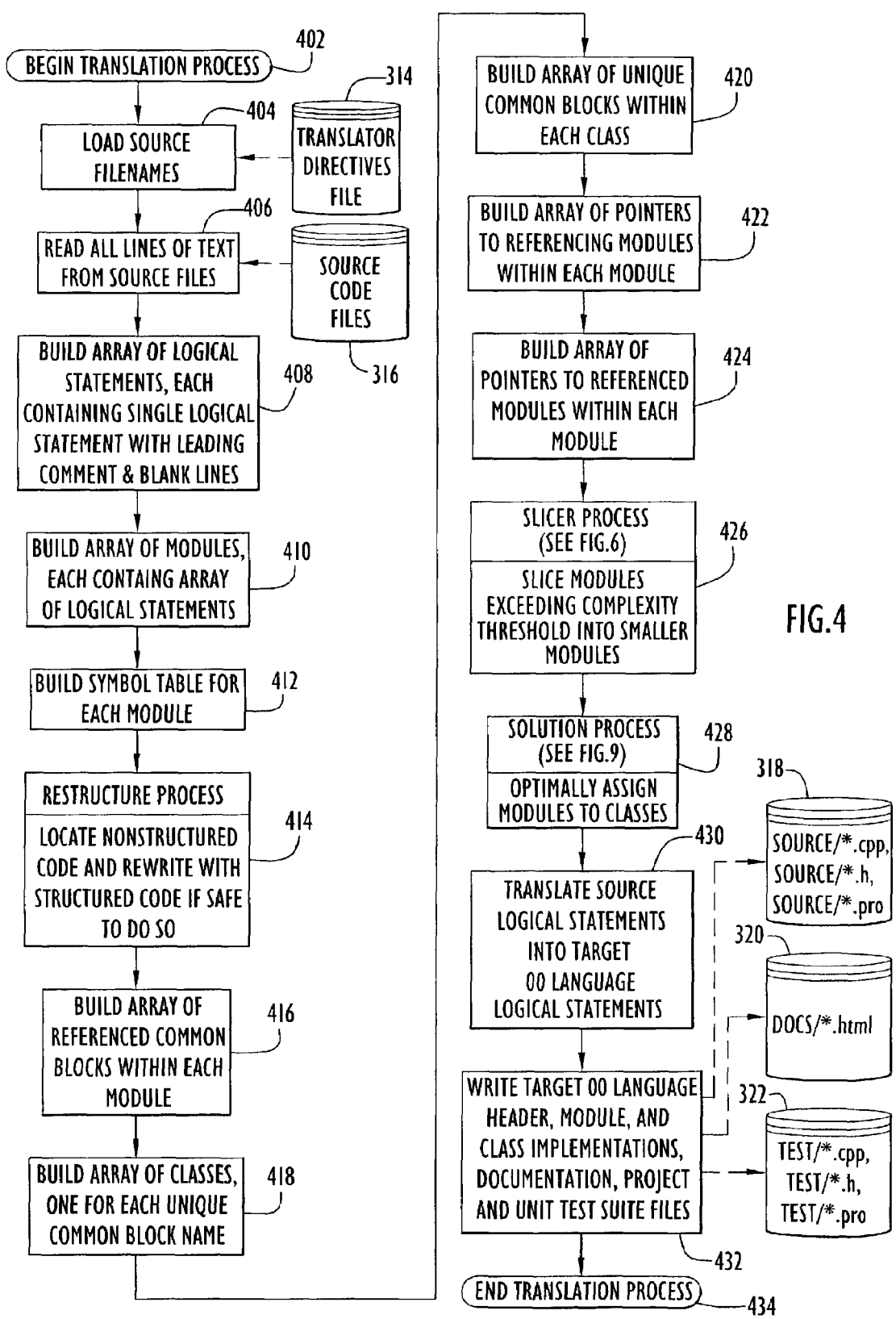
FIG. 4 is a procedural flow chart illustrating a representative manner in which the translation system translates procedurally-oriented modules into object-oriented software in accordance with the present invention.
Figure 5:
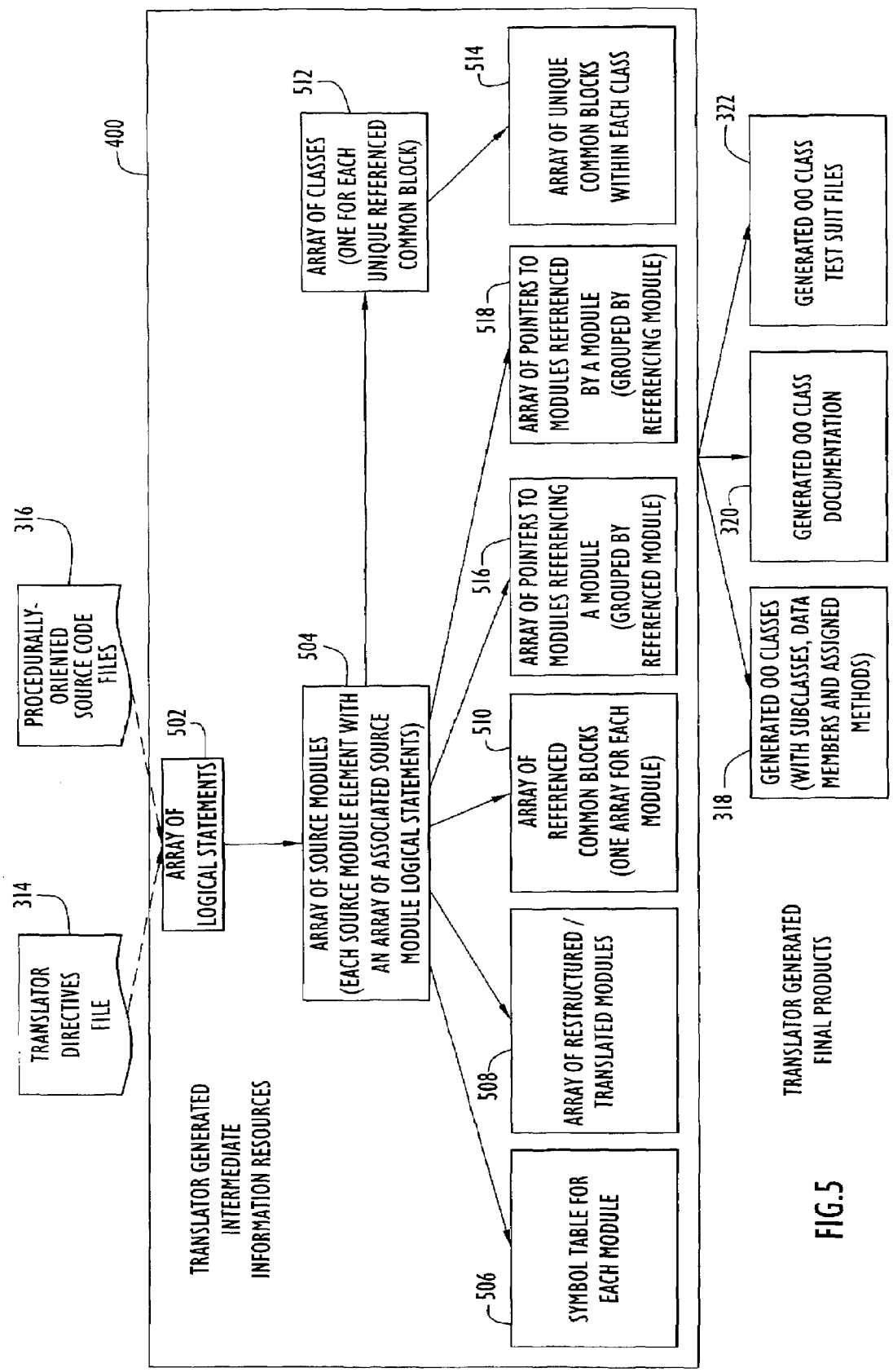
FIG. 5 is a block diagram of a representative information flow from the original procedurally-oriented source code to intermediate information repositories and to generated object-oriented source code and related materials in accordance with the present invention.

A representative manner in which the translation system translates procedurally-oriented modules into object-oriented software is illustrated in FIGS. 3-5. Initially, the system builds intermediate data stores or arrays (FIG. 5) that are used to support the generation of object-oriented classes, documentation, and test suite files. Specifically, upon starting the translation process at step 402, translation controller module 302 loads, at step 404, a list of source filenames from translator directives file 314, and reads, at step 406, all lines of text from the identified source files. The translation controller module builds, at step 408, an array of logical statements 502 from the lines of source code received from source code files 316. The array of logical statements 502 may be a list of source code lines, including comment lines. Each non-blank non-comment line is stored in uppercase characters and appropriate formatting is appended to each line, such as semi-colons at the ends of lines and/or a "//" string prior to a line of comments in lowercase.

At step 410, the translator control module builds an array of source modules 504 from array of logical statements 502. Each source module element includes an array of associated source module logical statements in order as extracted from array of logical statements 502, and organized by source module element.

Next, the translation controller module parses the logical statements associated with each module in array of source modules 504 and builds a set of array structures as described below containing information derived from array of source modules 504. The set of array structures provide access to intermediate data that is processed by the translator controller module to generate object-oriented classes from the modules contained within array of source modules 504. Preferably, a symbol table 506 is built at step 412 that includes for each identified module, a list of definitions for each variable or function included within the logical statements of the module. Further, an array of restructured modules 508 is built at step 414, at which step logical statements associated with modules within array of source modules 504 that contain unstructured code, such as jumps or GOTO statements, are restructured using conventional restructuring techniques and stored within array of restructured modules 508 by translation system restructure module 304. The restructure module typically employs conventional restructuring tools (e.g., For_Struct, etc.), but may employ or further include custom tools to accommodate particular language extensions. An array of common blocks 510 (i.e., common, shared, or global blocks) referenced by a module (grouped by referencing module) is built at step 416, while an array of classes 512 is built at step 418, that contains a class entry for each unique common block (i.e., common, shared, or global block) referenced within array of source modules 504. An array of unique common blocks within each class 514 is built at step 420 that captures hierarchical relationships between classes. Moreover, an array of pointers 516 (to array elements within array of source modules 504) to modules referencing a module (grouped by referenced module) is built at step 422 and an array of pointers 518 (to array elements within array of source modules 504) to modules referenced by a module (grouped by referencing module) is built at step 424.

Once the set of array structures containing information derived from array of source modules 504 has been created, the translation system initiates, at step 426, complexity reduction or slicer module 306. The slicer module decomposes a module that exceeds a first predefined complexity threshold into smaller modules that are below a second predefined complexity threshold as described below.

Upon completion of the slicing process, solution module 308 is executed at step 428 that evaluates each module contained within the array of source modules 504, and attempts to assign each module to a class, defined in array of classes 512 as described below. Since the solution module attempts to maximize the number of private class members within the generated object-oriented code produced by the translation system, a module is assigned to the class from which the module references the most class members. When used in conjunction with the slicer module, the probability that modules will be assigned to an appropriate object-oriented class is greatly increased.

Upon completion of the solution module, translation module 310 is invoked at step 430. The translation module preferably employs conventional translation techniques to translate the syntax of each logical statement associated with each procedurally-oriented module identified in array of source modules 504 to the syntax of the target object-oriented language. Information contained within symbol table 506, restructured modules array 508, referenced common blocks array 510, array of classes 512, array of unique common blocks within each class 514, referencing modules array 516 and referenced modules array 518, are used to resolve references in the source code, such as symbols and calls to private or public methods/members. The translated syntax may be stored within restructured modules array 508.

Upon completion of syntax translation, the translation system control module initiates file generation module 312 at step 432 to generate object-oriented class source code files 318, technical software documentation files 320, and project and unit test suite files 322 based upon the structured arrays identified above (e.g., symbol table 506, restructured modules array 508, referenced common blocks array 510, array of classes 512, array of unique common blocks within each class 514, referencing modules array 516, and referenced modules array 518) and the translated module logical statements contained in modules array 508. The process terminates at step 434 where the generated object-oriented source code and associated files may be utilized on a target system.

Figure 6:
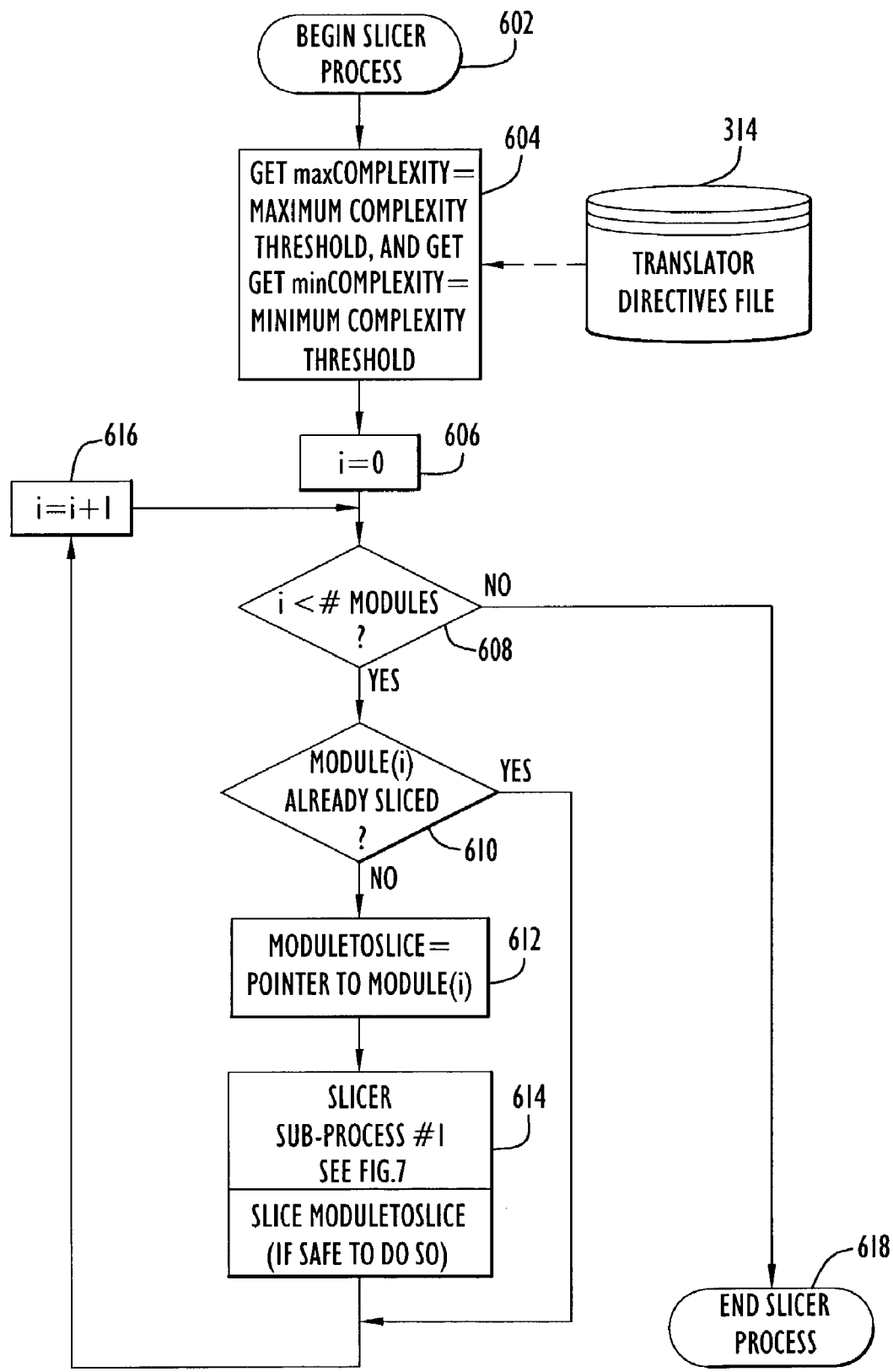
FIG. 6 is a procedural flow chart illustrating a representative manner in which the slicer module of the present invention translation system coordinates reducing the complexity of procedurally-oriented source code modules.
Figure 7:
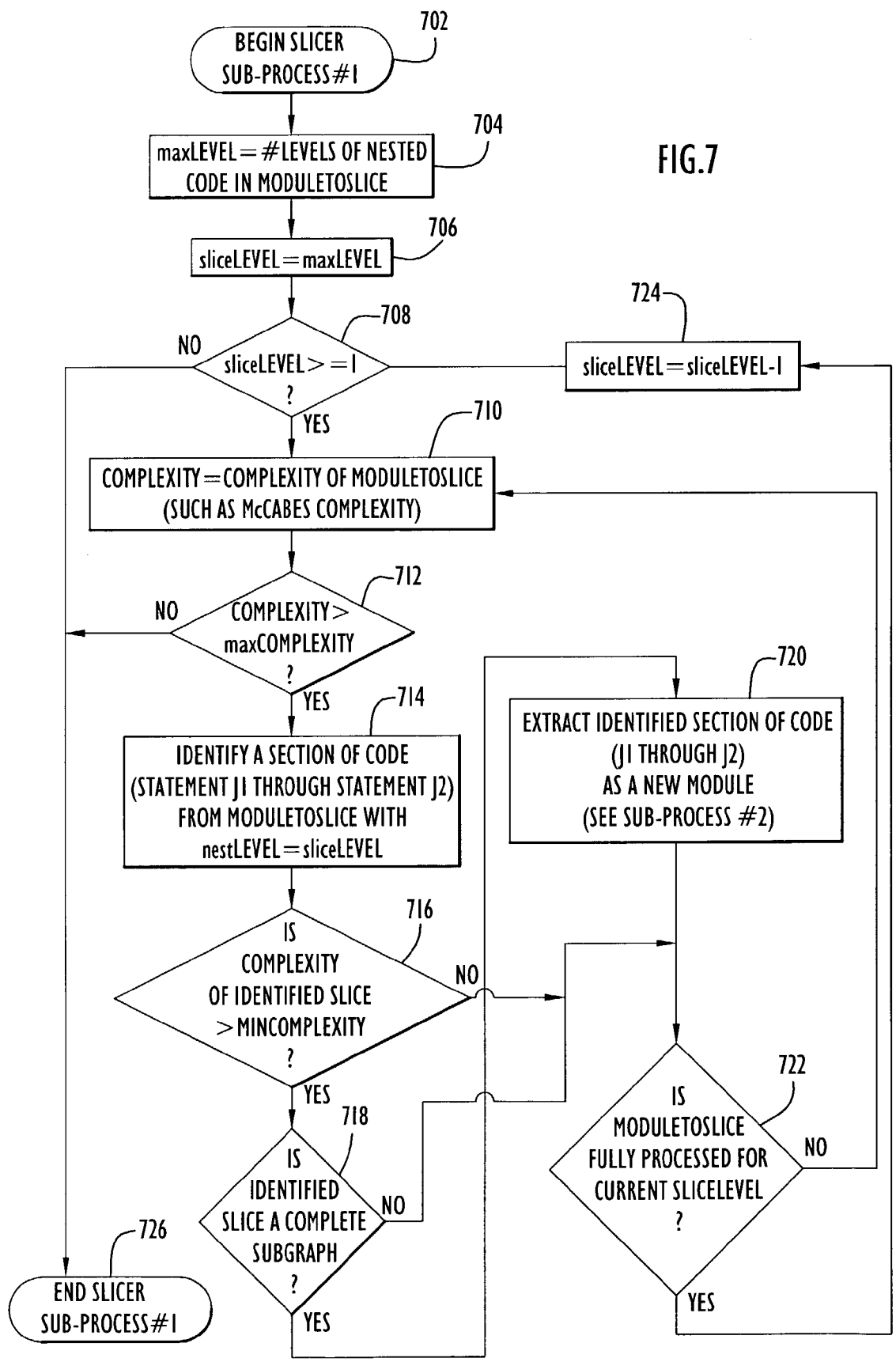
FIG. 7 is a procedural flow chart illustrating a representative manner in which the slicer module coordinates reducing the complexity of a single module into plural less complex modules in accordance with the present invention.
Figure 8:
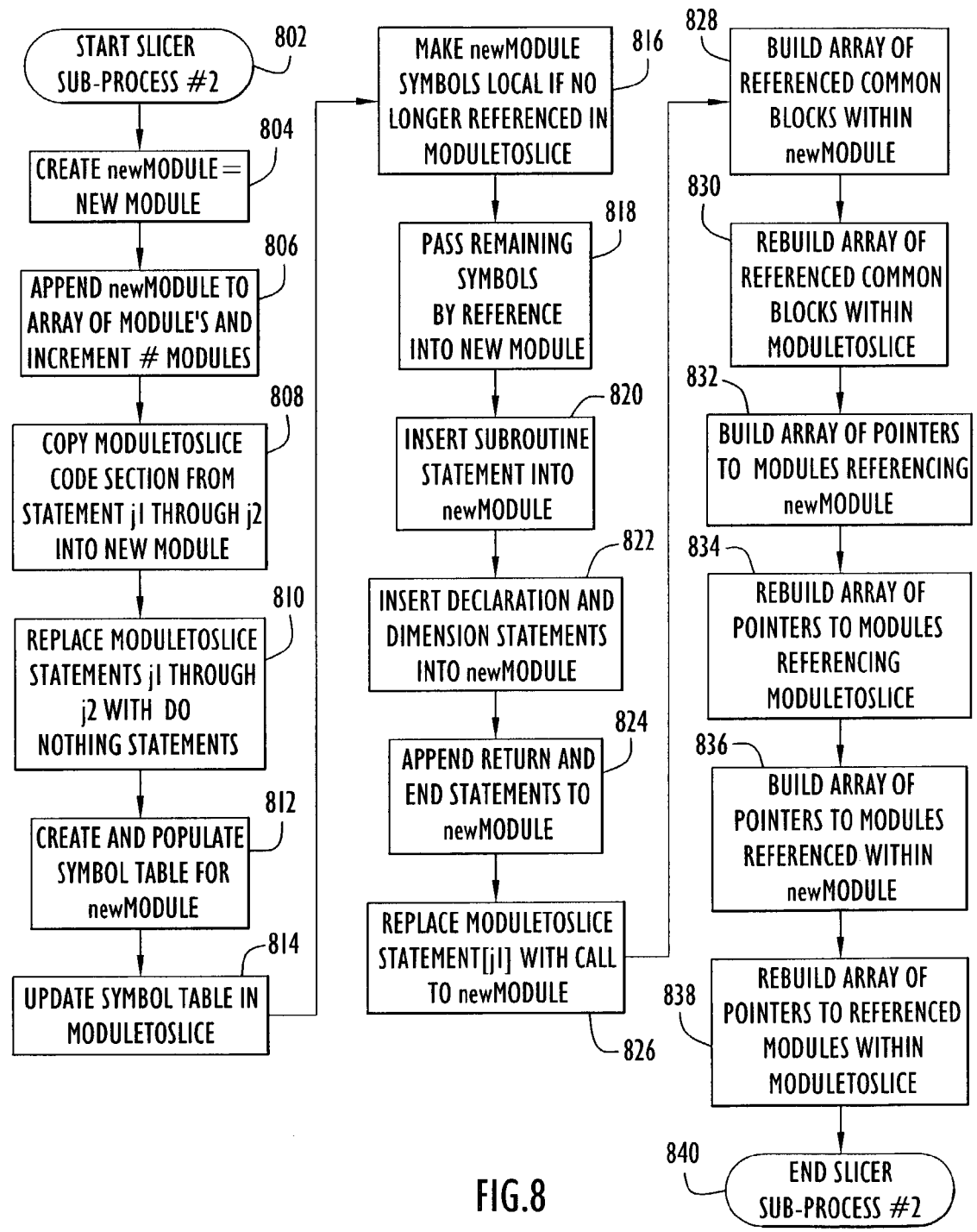
FIG. 8 is a procedural flow chart illustrating a representative manner in which the slicer module creates a new module from a portion of a procedural module identified for slicing in accordance with the present invention.

A representative manner in which slicer module 306 reduces the complexity of procedurally-oriented source code modules is illustrated in FIGS. 6-8. Specifically, upon initiating the slicer process at step 602, the slicer module reads, at step 604, from translator directives file 314 (FIG. 3) a maximum and minimum complexity threshold. The maximum complexity parameter identifies a maximum complexity threshold allowed for a single source code module. The minimum complexity parameter identifies a minimum complexity that a segment of code identified for slicing must exceed in order for the identified segment of code to be extracted as a separate module.

The slicer module executes a counter based loop that processes each module contained within array of source modules 504 (FIG. 5) in sequential array index order. In particular, an index 'I' is initialized, at step 606, and so long as index 'I' remains less than the number of module elements within array of source modules 504, as determined at step 608, an instance of the loop is processed. Otherwise the loop, and the entire process, terminates, at step 618. At the conclusion of a loop instance, the index is incremented at step 616 in preparation for the next loop cycle.

It is important to note that, as each module is processed, newly created modules are added to array of source modules 504 by the slicing process. Such newly created modules already comply with the minimum and maximum complexity thresholds described above. The module element data contained in array of source modules 504 includes a parameter that identifies whether a module has already been sliced.

During each loop cycle, the module referenced in array of source modules 504 by index 'I' is checked at step 610 to determine whether the module has already been sliced. If the indexed module has already been sliced, index 'I' is incremented at step 616 in preparation for the next loop cycle. If the indexed module has not already been sliced, a pointer to the currently indexed module is stored at step 612 to a shared variable (depicted in step 612 as variable "MODULETOSLICE") and the shared variable is passed at step 614 to a slicer sub-process described below so that the module can be assessed for segments appropriate for slicing.

The manner in which the slicer sub-process processes a single procedurally-oriented source code module is illustrated in FIG. 7. Procedurally-oriented source code modules typically contain nested standardized source code constructs, wherein each nested level represents a segment of conditionally executed code, such as conditional loops and "IF" statements. The outermost construct has a nesting level of 0. Nesting levels increase by 1 for each nesting of a standard construct. The slicer module begins searching at the module's innermost nesting level (i.e., the highest level of nested code within a module) and terminates searching at nesting level 1. No slicing is ever performed at the modules outermost nesting level (i.e., nesting level 0).

The slicer sub-process examines a module's complexity to determine if it should be sliced. Modules that are determined to have a complexity less than the maximum module complexity parameter are not sliced. One complexity algorithm appropriate for use by the translation system is an approximation of McCabe's complexity algorithm although other complexity algorithms can be used. The module maximum complexity threshold parameter and segment minimum complexity parameter are selected to correspond with the approximation algorithm selected for use.

Specifically, upon initiation of the slicer sub-process at step 702, the sub-process determines at step 704 the maximum number of levels (maxLEVEL) of nested code contained within the module to be sliced (MODULETOSLICE) and sets a loop control variable (sliceLEVEL) at step 706 to be equal to the determined maximum level. A loop parses all logical statements associated with the module for each level from the maximum number of levels (maxLEVEL) to level one. Upon the sliceLEVEL variable reaching zero, the sub-process terminates at step 726.

For each loop cycle, if the sub-process determines at step 708 that the current value of sliceLEVEL is greater to or equal to 1, a complexity algorithm is applied at step 710 to determine the complexity of the module as described above. If the complexity of the module is greater than the maximum module complexity parameter as determined at step 712, the sub-process parses through the module to identify, at step 714, a section of code from within the module that is nested at the current level. Typically, the section of code identified for slicing is identified with statement pointers (e.g., J1 and J2) within array of source modules 504 (FIG. 5) to the first and last logical statements of the section of code to be sliced.

If the sub-process determines at step 716 that the complexity of the identified section of code exceeds a minimum slice complexity parameter and that the slice is a complete subgraph as determined at step 718, the pointers to the first and last logical statement of the identified section of code are passed, at step 720, to an extraction sub-process for extraction as a separate module as described below. A "complete subgraph" generally refers to a section of code that contains no references nor is referenced by code external to the code segment (e.g., a complete subgraph does not contain a RETURN statement, a GOTO statement that branches to statements outside the code section, a call to an external module, code branched to or called from code external of the code segment, etc.).

If the sub-process determines, at step 722, that all logical statements associated with the module have been evaluated for slicing at the current level, the sliceLEVEL value is decremented, at step 724, and the loop repeats at step 708. If the sub-process determines at step 716, that the complexity of the identified section of code does not exceed a minimum slice complexity parameter or determines, at step 718, that the slice is a not a complete subgraph, processing proceeds to step 722 to determine whether all logical statements associated with the module have been evaluated for slicing at the current level, as described above. If the sub-process determines at step 722, that all logical statements associated with the module have not been evaluated for slicing at the current level, processing proceeds to step 710, where the current state of logical statements are assessed to determine whether the complexity of the module still exceeds the maximum module complexity parameter as described above. If the complexity of the module does not exceed the maximum module complexity parameter, the sub-process terminates at step 726, regardless of whether any logical statements associated with the module have been evaluated for slicing.

The manner in which the extraction sub-process creates a new module from a segment of module code identified for slicing is illustrated in FIG. 8. As described above, pointers within array of source modules 504 (FIG. 5) to first (J1) and last (J2) logical statements of a segment of code identified for extraction are identified prior to execution of the extraction sub-process. Upon initiation of the extraction sub-process at step 802, a new module (newMODULE) is created at step 804 and a pointer to the new module is appended to array of source modules 504 (FIG. 5) and a count of total modules represented in array of source modules 504 is incremented at step 806.

Next, logical statements J1 through J2 are copied, at step 808, from array of source modules 504, into the new module and statements J1 through J2 within the original module from which the section of code is sliced are replaced, at step 810, with statements that perform no function (i.e., "NO OPS" or "DO NOTHING") statements.

In order to ensure that the new module is correctly processed as an original source code module by the translation system, additional syntax must be added to the new and original modules, relationships within the internal arrays used by the translation system with respect to new module must be created and relationships within the internal arrays used by the translation system with respect to the original module must be updated. In particular, a symbol table for the new module is created, at step 812, and the symbol table originally created for the original module is updated, at step 814, to reflect creation of the new module and any symbols specific to the new module removed from the original module. Symbols within the new module symbol table that are no longer referenced in the original module are made local, at step 816, and the original and new modules are updated to pass remaining symbols by reference into the new module, at step 818. Subroutine, declaration, dimension, return and end statements are inserted into the new module at steps 820, 822 and 824. Logical statement J1 in the original module is replaced, at step 826, with a call to the new module.

As described above, relationships within the internal arrays used by the translation system with respect to the new module and original module must be created/updated to allow the translation system to properly process the modules. Pointers to common blocks referenced by the new module (i.e., pointers within referenced common blocks array 510 (FIG. 5)) are built at step 828, and pointers to common blocks referenced by the original module are rebuilt at step 830. Pointers to modules referencing the new module (i.e., pointers within referencing modules array 516 (FIG. 5)) are built at step 832, and pointers to modules referencing the original module are rebuilt at step 834. Pointers to modules referenced by the new module (i.e., pointers within referenced modules array 518 (FIG. 5)) are built at step 836, and pointers to modules referenced by the original module are rebuilt at step 838. Once relationships within the internal arrays used by the translation system are built with respect to the new module, and rebuilt with respect to the original module, extraction of the identified segment of code is complete and the extraction sub-process terminates, at step 840.

Figure 9:
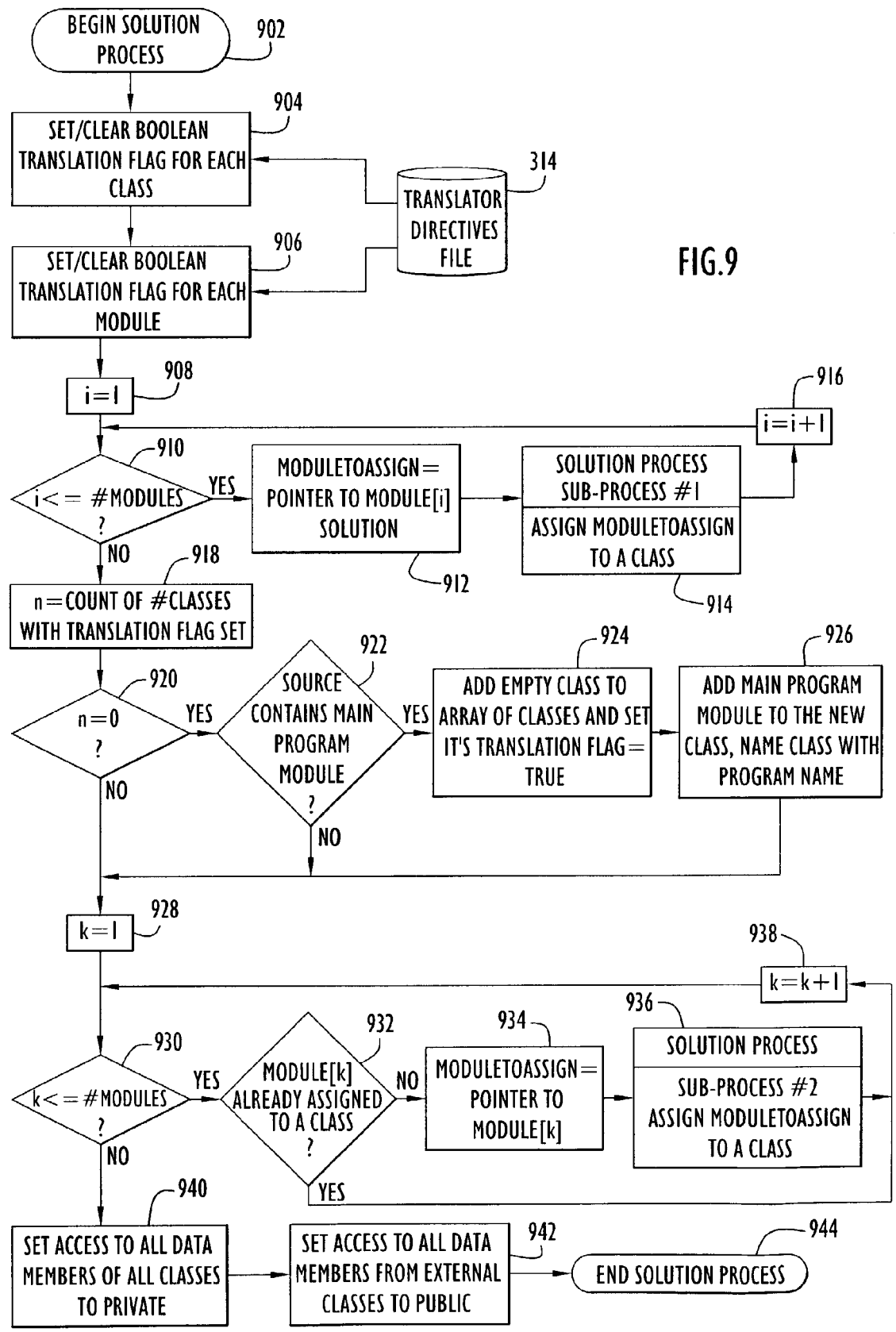
FIG. 9 is a procedural flow chart illustrating a representative manner in which the solution module of the present invention translation system efficiently assigns procedural modules to generated classes derived from global data blocks by maximizing the number of private class members in the generated object-oriented classes.

Once the source code modules are reduced below a predetermined complexity level by the slicer module, solution module 308 (FIG. 3) assigns the respective source code modules to a class in a manner that maximizes the number of private class members within the generated object-oriented code. A representative manner in which the solution module efficiently assigns procedural modules to generated classes derived from global data blocks is illustrated in FIG. 9. Basically, the solution process includes plural techniques to efficiently assign a module to a defined class. One technique attempts to assign each module to the class from which the module references the most class members (i.e., data members, and/or class methods). Another technique attempts to assign any modules that remain unassigned to a class based upon the assignment of a parent module that references the unassigned module. Specifically, upon initiating the solution module at step 902, a boolean translation flag is set at step 904 to "true" for each class defined within array of classes 512 (FIG. 5) to indicate that each class is to be translated by the translation module 310 (FIG. 3). A boolean translation flag is further set, at step 906, to "true" for each module defined in array of source modules 504 to indicate that the module is to be translated by the translation module 310 (FIG. 3). Instructions within translator directives file 314, however, can be used to override the default translation flag settings, as described below, to selectively control whether a data block or module is to be translated into the generated object-oriented classes.

Class translation flags described above are either set or cleared to indicate whether particular data blocks should be translated to a class. In general, all global data blocks would normally be translated to classes. There are instances however when it may be desirable not to translate one or more global data blocks. One case is when a global data block has previously been translated to a class that the generated application is to be linked. Another instance is when the data contained within the global data block is not related by some common functionality. For example, if data was grouped by data type and not by function (e.g., all integers in one block, all characters in a second block, etc.), it may not make sense to translate such data blocks into classes. Only those global data blocks containing data related by some common functionality should be translated to classes. The present invention translation system allows a user to control whether an individual data block is to be translated based upon flag set/clear user instructions stored in translator directives file 314.

Similarly, flags are either set or cleared for each module to indicate whether a particular module should be translated to a class method. Normally, all modules in an application would be translated. There may be some cases where the source code for the module exists both in the application and also in a library that may have already been translated. The module translation flag is utilized to help guide the translation in unusual cases. The present invention translation system allows a user to control whether a module is to be translated based upon flag set/clear user instructions stored in translator directives file 314.

The solution module loops through each module within array of source modules 504 in sequential order, starting with the first pointer in the array and ending with the last pointer in the array, and initiates an assignment sub-process to assign each module to the class from which the module references the most class members. In particular, a counter 'I' is initialized to one at step 908 for use as an index into array of source modules 504. As long as counter 'I' is less than or equal to the number of modules in array of source modules 504, a pointer MODULETOASSIGN is initialized to a pointer identifying the module within array of source modules 504 at the current counter 'I' index, and MODULETOASSIGN is submitted for processing by the class assignment sub-process described below to assign the module to the class from which the module references the most class members. Upon returning from the assignment sub-process, the counter is incremented, at step 916, and the loop repeats until all pointers within array of source modules 504 have been processed.

The solution process further checks for a rare condition in which the source code does not contain any common or shared data structures to be translated into classes. If, upon completing the class assignment sub-process described above, the solution process determines, at step 918 and 920, that no class translation flags have been set, indicating that no classes are to be translated by the translation module 310 (FIG. 3), the source code logical statements are parsed at step 922 to determine whether the source code contains only a main program module. If so, a single new class is created and added to the previously empty array of classes 512 (FIG. 5) at step 924 and the translation flag for the newly created class is set to "true," indicating that the class is to be translated. Next, the main program is added, at step 926, to the new class, and the class is assigned the same name as the assigned module.

Next, the solution process loops through the set of modules identified within array of source modules 504 to assign each module that has not been assigned by the class assignment sub-process. A counter 'K' is initialized to one, at step 928, for use as an index into array of source modules 504. As long as counter 'K' is less than or equal to the number of modules in array of source modules as determined at step 930, the solution module checks, at step 932, to see if the module identified or indexed by counter 'K' has already been assigned. If the module is already assigned, counter 'K' is incremented, at step 938, and the loop repeats, at step 930. If the module has not already been assigned, pointer variable MODULETOASSIGN is initialized, at step 934, to the pointer identifying the module within array of source modules 504 at the current counter 'K' index, and MODULETOASSIGN is submitted, at step 936, for processing by a secondary assignment sub-process described below. The secondary sub-process assigns any modules that remain unassigned as a result of the class assignment sub-process (i.e., based upon referenced class members) to a class based upon the assignment of a parent module that references the unassigned module. Upon returning from the secondary sub-process, the counter is incremented, at step 938, and the loop repeats, at step 930, until all pointers within array of source modules 504 have been processed.

Upon completing the loop controlling execution of the secondary sub-process the solution module sets access, at step 940, to all data members of all classes to private, and sets access, at step 942, to all data members called from external classes to public. This allows access to data members by external methods in accordance with the need for such external access based upon the module assignments as determined by the solution module. Upon setting access, the solution module terminates at step 944.

Figure 10:
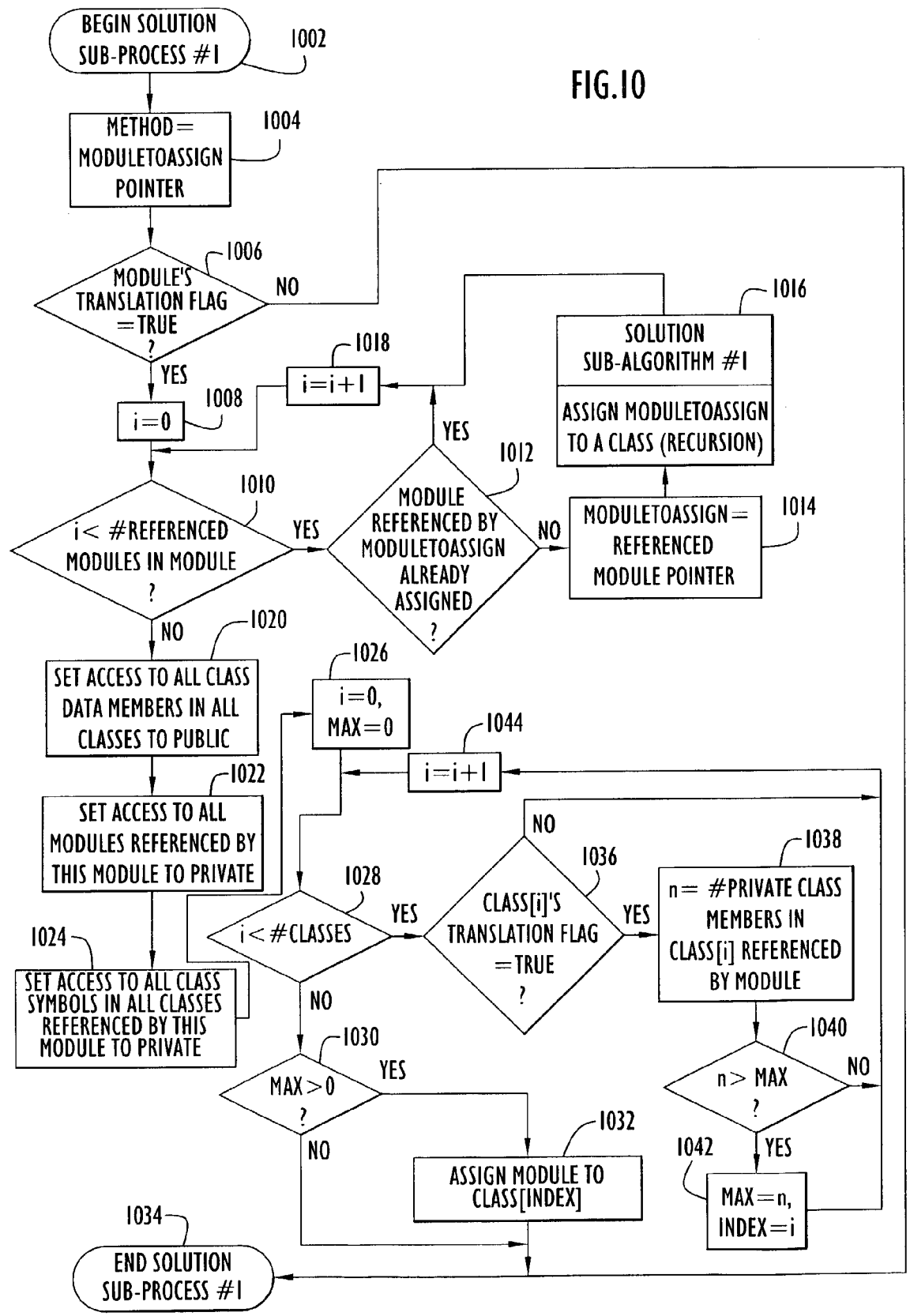
FIG. 10 is a procedural flow chart illustrating a representative manner in which the solution module uses recursion to ensure that all assignable called modules are assigned prior to assigning a calling module to an object-oriented class in accordance with the present invention.

The manner in which the class assignment sub-process attempts to assign each module to the class from which the module references the most class members (i.e., data members, and/or class methods) is illustrated in FIG. 10. The class assignment sub-process uses recursion to ensure that all assignable modules called from a module are assigned to an object-oriented class before attempting to assign the calling module. The modules are assigned to the class from which the calling module references the most class members (i.e., data members, and/or class methods). Specifically, upon initiation of the sub-process at step 1002, the MODULETOASSIGN pointer received from the solution module (FIG. 9) is stored to a local variable at step 1004. If the value of the translation flag associated with the module identified by pointer MODULETOASSIGN within array of source modules 504 is set to "false," as determined at step 1006, indicating that the module is not scheduled for translation by translation module 310 (FIG. 3), the process terminates at step 1034. If the value of the translation flag associated with the identified module is set to "true," indicating that the module is scheduled for translation by translation module 310 (FIG. 3), a loop is initiated that recursively calls the sub-process to assure that all assignable modules called from the module are assigned to an object-oriented class before attempting to assign the calling module.

A loop control counter 'I' that is used as an index to array of referenced modules 518 (FIG. 5) is initialized at step 1008, to zero and, as long as the loop control counter 'I' is less than the number of modules referenced by the module pointed to or identified by pointer MODULETOASSIGN as determined at step 1010, the sub-process checks information associated with a module referenced by the identified module (e.g., the referenced module is identified by the pointer in array of referenced modules 518 (FIG. 5) indexed by counter 'I') to determine whether the referenced module has been assigned. If it is determined, at step 1012, that the referenced module has not been assigned, variable MODULETOASSIGN is set, at step 1014, to the referenced module pointer (e.g., the pointer within array of referenced modules 518 indexed by counter 'I') and the sub-process is recursively called, at step 1016, to assign the referenced module to a class. The recursive call enables assignment of modules within a chain of nested module references (e.g., a referenced module references another module that references further modules, etc.) that is associated with the current referencing module identified in array 518 by counter 'I.' Basically, the recursive call assigns referenced modules at the innermost nested level and traverses the remaining outer nested levels in succession to assign referenced modules within those outer levels. Thus, the recursive call enables assignable modules called from a module to be assigned to a class prior to assignment of the calling module to a class. Upon completion of the recursive call, at step 1016, the counter 'I' is incremented at step 1018 and the loop repeats at step 1010.

Once it is determined that all modules referenced by the current module have been assigned to a class, the sub-process initiates a loop to assign the module to the class from which the module references the most class members (i.e., data members, and/or class methods). In preparation for the class assignment loop, the sub-process sets, at step 1020, access to all class data members in all classes to public, sets, at step 1022, access to all modules referenced by the module to private, sets, at step 1024, access to all class symbols in all classes referenced by the module to private, and initiates, at step 1026, a loop counter 'I' to zero, and a maximum referenced member count (MAX) to zero. If the counter 'I' is less than the number of classes defined in array of classes 512 (FIG. 5) at step 1028, the sub-process determines at step 1036 if the transition flag for the class within array of classes 512 indexed by counter 'I' is set, indicating that the class is scheduled for translation by translation module 310 (FIG. 3). If the transition flag for the indexed class is set, a count (N) is set at step 1038 to the number of private class members (e.g., variables/data members, modules/methods) in the indexed class that are referenced by the module to be assigned. If, at step 1040, count (N) is greater than MAX, MAX is set to N, and an internal index variable (INDEX) is set to I. If, at step 1036, the transition flag for the indexed class is not set, or, if at step 1040, count (N) is not greater than MAX, the loop counter 'I' is incremented, at step 1044, and the loop is repeated at step 1028 without affecting the values of MAX or INDEX, as described above.

If, at step 1028, the counter 'I' is not less than the number of classes defined in array of classes 512 (FIG. 5), and if, at step 1030, MAX is greater than zero, the module to be assigned is assigned to the class within array of classes 512 indexed by the internal index variable INDEX. Otherwise, if, at step 1030, MAX is not greater than zero, the sub-process terminates at step 1034.

Figure 11:
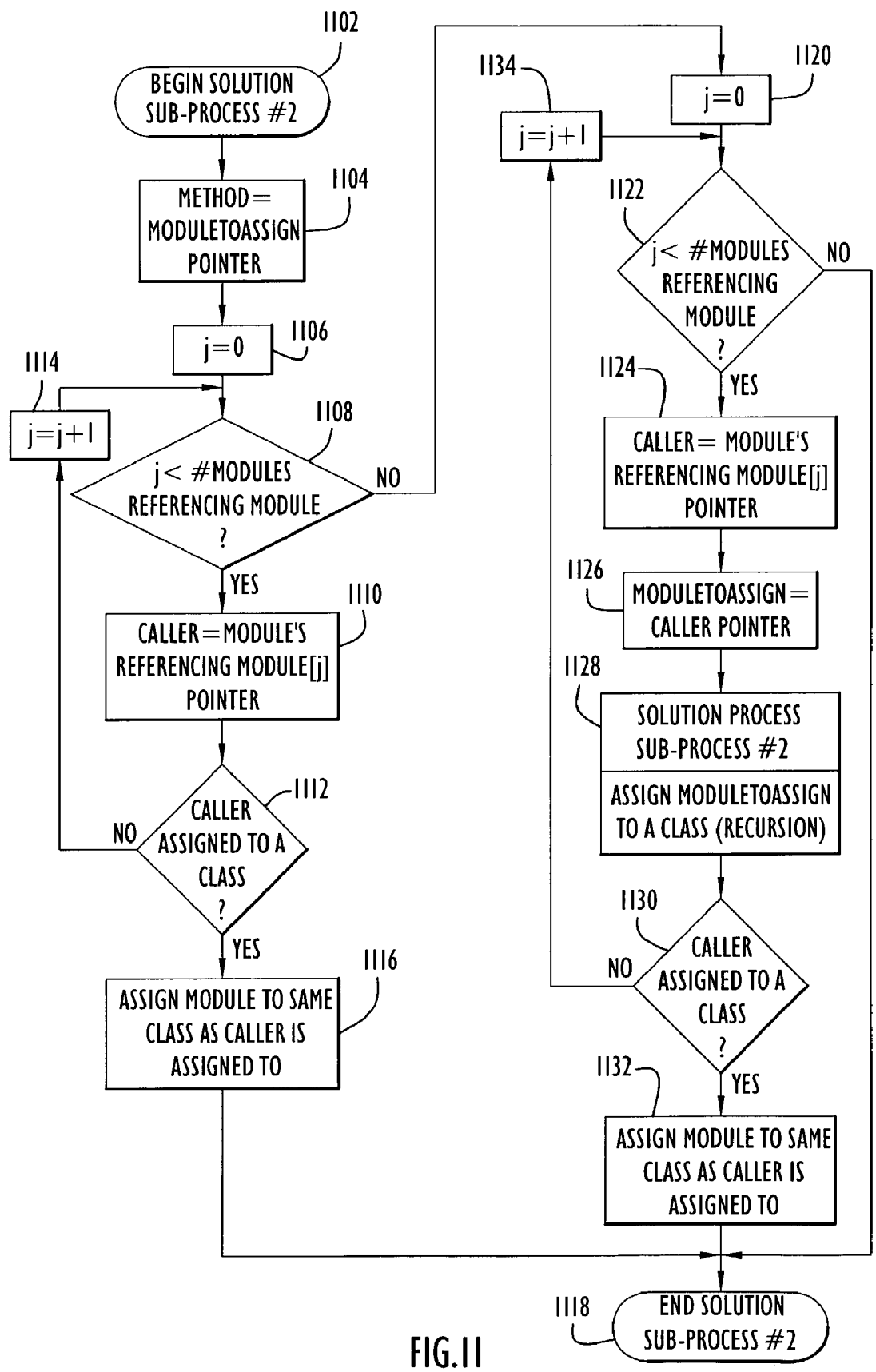
FIG. 11 is a procedural flow chart illustrating a representative manner in which the solution module assigns previously unassigned modules to object-oriented classes in accordance with the present invention.

The manner in which the secondary assignment sub-process attempts to assign each module, previously unassigned by the class assignment sub-process, is illustrated in FIG. 11. This sub-process assigns an unassigned module to the same class to which a module that calls the unassigned module has been assigned. If no modules that call the unassigned module have themselves been assigned, the sub-process uses recursion to call this same sub-process to assign a calling module and then assigns the unassigned module to the same class as the newly assigned calling module. Specifically, upon initiation of the sub-process at step 1102, the MODULETOASSIGN pointer received from the solution process (FIG. 9) is stored to a local variable at step 1104. A loop control counter 'J' that is used as an index to array of referencing modules 516 (FIG. 5) is initialized, at step 1106, to zero and, as long as the loop control counter 'J' is less than the number of modules referencing the module pointed to or identified by pointer MODULETOASSIGN as determined at step 1108, the sub-process checks information associated with the identified module at steps 1110 and 1112, to determine whether the referencing/calling module has been assigned. If, at step 1112, the calling module has been assigned, the unassigned module is assigned, at step 1116 to the same class as the calling module and the sub-process terminates at step 1118. If, at step 1112, the calling module has not been assigned, counter 'J' is incremented and the loop is repeated at step 1108.

If, at step 1108, the loop control counter 'I' is not less than the number of modules referencing the identified module (e.g., no calling module is assigned), a loop is initiated that uses recursion to locate and/or assign a calling module. In particular, loop control counter 'J' is reused as an index to array of referencing modules 516 (FIG. 5) and initialized to zero, at step 1120. As long as the loop control counter 'J' is less than the number of modules referencing the module identified by pointer MODULETOASSIGN as determined at step 1122, a pointer variable CALLER is initialized, at steps 1124 and 1126, to the calling module referenced by the pointer within array of referencing modules 516 indexed by counter 'J', and the sub-process is called recursively at step 1128, to assign the module identified by the CALLER variable.

If, at step 1130, the calling module has been assigned, the unassigned module is assigned, at step 1132 to the same class as the calling module and the sub-process terminates at step 1118. If, at step 1130, the calling module has not been assigned, counter 'J' is incremented, at step 1134, and the loop is repeated at step 1122. If, at step 1122, the loop control counter 'J' is not less than the number of modules referencing the identified module, the sub-process terminates at step 1118. The recursive call basically enables a chain of calling modules associated with the identified module to be searched for and/or assigned to a class of one of the calling modules in the chain.

It will be appreciated that the embodiments described above and illustrated in the drawings represent only a few of the many ways of implementing a computer language translation system and method of converting procedural computer language software to object-oriented computer language software.

The procedural and target workstations and/or processors may be implemented by any type of personal or other computer or processing system having any suitable platform or operating system. Communication devices may be implemented by any conventional or other type of communication devices (e.g., wired, wireless, etc.). The network may be implemented by any type of communications network (e.g., LAN, WAN, Internet, etc.) and may be accessible via any types of communication medium or devices.

The translation system may be implemented by any quantity of any personal or other type of computer or processing system (e.g., IBM-compatible, Apple, Macintosh, laptop, palm pilot, microprocessor, etc.). The computer system may include any commercially available operating system (e.g., Windows, OS/2, Unix, Linux, DOS, etc.), any commercially available and/or custom software (e.g., communications software, translation system software, etc.) and any types of input devices (e.g., keyboard, mouse, microphone, voice recognition, etc.). It is to be understood that the software of the translation system may be implemented in any desired computer language, and could be developed by one of ordinary skill in the computer and/or programming arts based on the functional description contained herein and the flow charts illustrated in the drawings. Further, any references herein of software performing various functions generally refer to computer systems or processors performing those functions under software control. The computer system may alternatively be implemented by hardware or other processing circuitry. The various functions of the translation system may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The software and/or processes described above and illustrated in the flow charts and diagrams may be modified in any manner that accomplishes the functions described herein.

The translation system may be a stand-alone system or may be coupled to any number of workstation computers, server computers or data storage devices via any communications medium (e.g., network, modem, direct connection, etc.). Legacy or procedural modules may be transferred from the procedural environment to the translation environment via the communications medium or via storage of the modules on transportable storage devices (e.g., floppy disk, CD ROM, DVD, zip drive disk, etc.). The test environment may include any type of conventional or other testing suite using software and/or other modules to perform testing in a simulated test environment. The generated test files/scripts may be implemented in any suitable computer language and have any desired formats.

It is to be understood that the translation system may be implemented by any type of computer or processing system including software developed in any suitable computing language performing the above-described functions. For example, in one embodiment the translation system can be written using the object-oriented C++ language, however, the present invention is not limited to being implemented in any specific programming language. The various module and other data (e.g., translated lines, object-oriented classes, module line components, etc.) may be stored in any quantity or types of file, data or database structures. Moreover, the translation software may be available or distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

The translation software may be installed and executed on a computer system in any conventional or other manner (e.g., an install program, copying files, entering an execute command, etc.). The functions associated with the present invention (e.g., uploading, translation, generation, downloading, etc.) may be performed on any quantity of computers or other processing systems. Further, the specific functions may be assigned to one or more of the computer systems in any desired fashion.

The translation system may be a stand-alone system, or may be coupled to the test system and/or target device in any combination via any suitable communications medium (e.g., network, modem, direct connection, etc.). The target system may be any system capable of using the generated object-oriented classes and may use any suitable platform or operating system. The target object-oriented classes may be transferred from the translation system to the target device via the communications medium or via storage of the object-oriented classes on transportable storage devices (e.g., floppy disk, CD ROM, DVD, zip drive disk, etc.).

The translation system may accommodate any quantity and any type of input files and/or databases or other structure containing procedurally-oriented source code in any desired format (e.g., ASCII, plain text, any word processor or other application format, etc.). The translation system may be implemented as a separate stand-alone program or software module or may be in the form of an embeddable system (e.g., within another system, as an embeddable software component within other software, etc.). The translation system may further function as a server in communication with client or user systems via any communications medium (e.g., network, WAN, LAN, Internet, Intranet, modem, etc.) to process client requests.

The translation system may translate any quantity of procedural/source modules or procedural/source files having source code in any procedurally-oriented language to produce any quantity of object-oriented classes. The object-oriented classes may be produced in any suitable object-oriented computer language in any desired format and may be compatible with any target system platform or device. Further, the translation system may use any quantity of DLL or other types of data files. The translation system may employ any suitable mapping scheme to parse source code syntax and to identify fields by any keywords or data types, and may employ any type of message transfer scheme to facilitate message transfer within the system (e.g., message queues, two-way queuing scheme, etc.). The message queues may be implemented by any suitable data structures (e.g., linked lists, queues, stacks, arrays, etc.), while mapping data may be stored in any suitable data structure.

The translation system may interact with a user and receive input text in any desired fashion. For example, the tool may include a user interface (e.g., Graphical User Interface, etc.) to receive file information concerning a file containing source code. The user may enter information via the computer system input device (e.g., mouse, voice recognition, etc.), where the interface may display directories to enable a user to select a file. When the tool is embedded in another application or system, the tool may receive the text or a file (e.g., containing the text) directly or an indication of a file or other storage area where the text may be found for processing. The generated object-oriented source code, test suite files and documentation may be provided to the user, software or system in any desired form (e.g., electronic file, database storage structure, etc.) and/or arranged in any manner or format.

The translation system may process and transfer information between modules in any desired fashion. For example, the source code files may be processed sequentially or any quantity or all of the source code files may be processed at a given time. Similarly, one or any other quantity of source code files may be processed at a given time. The tool may process documents upon receipt of text or at any time in a batch mode. In addition, the computer system may function as a server to process client requests for translation of individually submitted source code segments.

The translation system can be implemented in any number of translation modules and is not limited to the software module architecture described above. Each module can be implemented in any number of ways and are not limited in implementation to execute process flows precisely as described above. For example, generation of test files and generation of translation documentation is optional and is not required. Complexity reduction can be implemented as an optional function that is optionally invoked by a user based upon the user's assessment of the procedurally-oriented source code to be translated. Furthermore, any complexity algorithm function can be used to assess complexity of a module or to assess complexity of a segment of code selected from within a module for slicing. Assessment of complexity can be based upon any criteria and may include but is not limited to the number of logical statements/lines of code, complexity of logical statements, nested levels, number of logical branches/conditions.

Loop counters, flags and control variables can change in number, type and manner of use, initialized/final values, size of incremental adjustments. Control parameters can control/monitor loop execution in ascending, descending and/or another appropriate or orderly manner. The format and structure of internal structures used to hold intermediate information in support of the translation process can include any and all structures and fields an are not limited to the files, arrays, matrices, status and control booleans/variables described above. Modules can be assigned to an object-oriented class based upon any reference from the module to the class including references to class variables/data members, modules/methods assigned to the class, or any other means by which the module directly or indirectly references the class.

The present invention is not limited to the specific applications disclosed herein, but may be used for software development of any system to directly translate procedurally-oriented modules into object-oriented classes. Thus, the present invention may be used to translate procedurally-oriented modules used with any type of system to target object-oriented classes for any desired target system or platform.

From the foregoing description it will be appreciated that the invention makes available a novel computer language translation system and method of converting procedural computer language software to object-oriented computer language software wherein procedurally-oriented source code modules are converted to object-oriented software with the modules assigned to object-oriented classes based upon a measure of each modules' association to global or common data.

Having described preferred embodiments of a new and improved computer language translation system and method of converting procedural computer language software to object-oriented computer language software, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of translating software developed in a procedural computer language to a target object-oriented computer language, wherein said procedural computer language includes a plurality of modules and blocks of global data, said method comprising:
   (a) identifying and processing said plurality of modules within said procedural language software for assignment to object-oriented classes;
   (b) identifying said blocks of global data within said procedural language software, said global data in each said block of global data being accessible by one or more of said modules;
   (c) defining a plurality of object-oriented classes each from a corresponding identified block of global data;
   (d) identifying and recording the number of reference instances by which the plurality of modules accesses said identified blocks of global data and using the recorded information to iteratively assign the plurality of modules obtained from step (a) to the plurality of object-oriented classes defined in step (c) by:
      (d.1) retrieving each defined object-oriented class and each of said modules;
      (d.2) determining for each defined object-oriented class a count of the quantity of references by a retrieved module to class members of that class;
      (d.3) assigning the retrieved module to the defined object-oriented class associated with a count representing the maximum quantity of said references;
      (d.4) assigning a retrieved module unassigned in step (d.3) to either a newly defined object-oriented class or a defined object-oriented class that corresponds to a previously assigned module, wherein the previously assigned module is associated with the unassigned module;
      (d.5) repeating the determining and assigning steps for each retrieved module; and
      (d.6) for each object-oriented class, selectively setting class data members to either public or private in accordance with access of those class data members by the assigned modules; and
   (e) translating said procedural language to said target object-oriented language using the resulting object-oriented classes obtained in step (d) and producing an object-oriented version of said procedural language software for a target operating environment.

2. The method of claim 1, wherein step (a) further includes:
   (a.1) restructuring procedural language constructs for consistency with said object-oriented computer language.

3. The method of claim 1, wherein step (a) further includes:
   (a.1) examining each identified module to decompose that module into a plurality of modules in accordance with a module complexity.

4. The method of claim 3, wherein step (a.1) further includes:
   (a.1.1) decomposing a module with a complexity that exceeds a predefined complexity level into a plurality of decomposed modules wherein the complexity of each of said plurality of decomposed modules is less than the predefined complexity level.

5. The method of claim 1, wherein step (d.4) further includes:
   (d.4.1) assigning the unassigned module to a class to which another module that references said unassigned module is assigned.

6. The method of claim 1, wherein step (d.3) further includes:
   (d.3.1) assigning modules called by said retrieved module to a class prior to assigning said retrieved module to a class.

7. The method of claim 1, wherein step (e) further includes:
   (e.1) translating a module to said object-oriented computer language based upon a stored parameter associated with the module; and
   (e.2) translating a class based upon a stored parameter associated with the class.

8. The method of claim 1, wherein step (e) further includes:
   (e.1) generating an object-oriented class containing an assigned module.

9. The method of claim 8, wherein step (e.1) further includes:
   (e.1.1) generating documentation that describes the generated object-oriented class.

10. The method of claim 8, wherein step (e.1) further includes:
    (e.1.1) generating test scripts used to test the generated object-oriented class.

11. The method of claim 1, wherein the procedural computer language is Fortran and the target object-oriented computer language is C++.

12. A computer-implemented system for translating software developed in a procedural computer language to a target object-oriented computer language, wherein said procedural computer language includes a plurality of modules and blocks of global data, said system comprising:
    a processor to receive said procedural computer language and to translate said procedural computer language to said target object-oriented computer language, said processor including:
       a controller module to identify and process said plurality of modules within said procedural language software for assignment to object-oriented classes;
       a block module to identify said blocks of global data within said procedural language software and to define a plurality of object-oriented classes each from a corresponding identified block of global data, wherein said global data in each said block of global data is accessible by one or more of said modules;

a solution module to identify and record the number of reference instances by which the plurality of modules accesses said identified blocks of global data and to use the recorded information to iteratively assign the plurality of identified modules to the plurality of defined object-oriented classes by:

(a) retrieving each defined object-oriented class and each of said modules;

(b) determining for each defined object-oriented class a count of the quantity of references by a retrieved module to class members of that class;

(c) assigning the retrieved module to the defined object-oriented class associated with a count representing the maximum quantity of said references;

(d) assigning a retrieved module unassigned in (c) to either a newly defined object-oriented class or a defined object-oriented class corresponding to a previously assigned module, wherein the previously assigned module is associated with the unassigned module;

(e) repeating said determining and assigning for each retrieved module; and (f) for each object-oriented class, selectively setting class data members to either public or private in accordance with access of those class data members by the assigned modules; and a translation module to translate said procedural language to said target object-oriented language using the resulting object-oriented classes obtained by the solution module and produce an object-oriented version of said procedural language software for a target operating environment.

13. The system of claim 12, wherein the controller module includes:

a restructure module to restructure procedural language constructs for consistency with said object-oriented computer language.

14. The system of claim 12, wherein the controller module includes:

a complexity reduction module to examine each identified module to decompose that module into a plurality of modules in accordance with a module complexity.

15. The system of claim 14, wherein the complexity reduction module includes:

a decomposition module to decompose a module with a complexity that exceeds a predefined complexity level into a plurality of decomposed modules wherein the complexity of each of said plurality of decomposed modules is less than the predefined complexity level.

16. The system of claim 12, wherein the solution module includes:

a class assignment module to assign the unassigned module to a class to which another module that references said unassigned module is assigned.

17. The system of claim 12, wherein the solution module includes:

an assignment module to assign modules called by said retrieved module to a class prior to assigning said retrieved module to a class.

18. The system of claim 12, wherein the translation module includes:

a directives module to translate a module to said object-oriented computer language based upon a stored parameter associated with the module; and a class directives module to translate a class based upon a stored parameter associated with the class.

19. The system of claim 12, wherein the translation module includes:

a generator module to generate an object-oriented class containing an assigned module.

20. The system of claim 19, wherein the generator module includes:

a document generator module to generate documentation that describes the generated object-oriented class.

21. The system of claim 19, wherein the generator module includes:

a test script generator module to generate test scripts used to test the generated object-oriented class.

22. The system of claim 12, wherein the procedural computer language is Fortran and the target object-oriented computer language is C++.

23. A program product apparatus including a computer storage medium with computer program logic recorded thereon for translating software developed in a procedural computer language to a target object-oriented computer language, wherein said procedural computer language includes a plurality of modules and blocks of global data, said program product apparatus comprising:

a controller module to identify and process said plurality of modules within said procedural language software for assignment to object-oriented classes;

a block module to identify said blocks of global data within said procedural language software and to define a plurality of object-oriented classes each from a corresponding identified block of global data, wherein said global data in each said block of global data is accessible by one or more of said modules;

a solution module to identify and record the number of reference instances by which the plurality of modules accesses said identified blocks of global data and to use the recorded information to iteratively assign the plurality of identified modules to the plurality of defined object-oriented classes by:

(a) retrieving each defined object-oriented class and each of said modules;

(b) determining for each defined object-oriented class a count of the quantity of references by a retrieved module to class members of that class;

(c) assigning the retrieved module to the defined object-oriented class associated with a count representing the maximum quantity of said references;

(d) assigning a retrieved module unassigned in (c) to either a newly defined object-oriented class or a defined object-oriented class corresponding to a previously assigned module, wherein the previously assigned module is associated with the unassigned module;

(e) repeating said determining and assigning for each retrieved module; and (f) for each object-oriented class, selectively setting class data members to either public or private in accordance with access of those class data members by the assigned modules; and a translation module to translate said procedural language to said target object-oriented language using the resulting object-oriented classes obtained by the solution module and produce an object-oriented version of said procedural language software for a target operating environment.

24. The apparatus of claim 23, wherein the controller module includes:

a restructure module to restructure procedural language constructs for consistency with said object-oriented computer language.

25. The apparatus of claim 23, wherein the controller module includes:
    a complexity reduction module to examine each identified module to decompose that module into a plurality of modules in accordance with a module complexity.

26. The apparatus of claim 25, wherein the complexity reduction module includes:
    a decomposition module to decompose a module with a complexity that exceeds a predefined complexity level into a plurality of decomposed modules wherein the complexity of each of said plurality of decomposed modules is less than the predefined complexity level.

27. The apparatus of claim 23, wherein the solution module includes:
    a class assignment module to assign the unassigned module to a class to which another module that references said unassigned module is assigned.

28. The apparatus of claim 23, wherein the solution module includes:
    an assignment module to assign modules called by said retrieved module to a class prior to assigning said retrieved module to a class.

29. The apparatus of claim 23, wherein the translation module includes:
    a directives module to translate a module to said object-oriented computer language based upon a stored parameter associated with the module; and
    a class directives module to translate a class based upon a stored parameter associated with the class.

30. The apparatus of claim 23, wherein the translation module includes:
    a generator module to generate an object-oriented class containing an assigned module.

31. The apparatus of claim 30, wherein the generator module includes:
    a document generator module to generate documentation that describes the generated object-oriented class.

32. The apparatus of claim 30, wherein the generator module includes:
    a test script generator module to generate test scripts used to test the generated object-oriented class.

33. The apparatus of claim 23, wherein the procedural computer language is Fortran and the target object-oriented computer language is C++.

* * * * *